United States Patent
Takada (10) Patent No.: US 8,827,472 B2
(45) Date of Patent: Sep. 9, 2014

(54) DISPLAY APPARATUS, OPTICAL MEMBER, AND METHOD OF MANUFACTURING AN OPTICAL MEMBER

(75) Inventor: Tsuyoshi Takada, Tokyo (JP)

(73) Assignee: Sony Corporation (JP)

( * ) Notice: Subject to any disclaimer, the term of this patent is extended or adjusted under 35 U.S.C. 154(b) by 80 days.

(21) Appl. No.: 13/233,141

(22) Filed: Sep. 15, 2011

(65) Prior Publication Data
US 2012/0075839 A1 Mar. 29, 2012

(30) Foreign Application Priority Data

Sep. 24, 2010 (JP) ................................ P2010-214008

(51) Int. Cl.
*F21V 9/14* (2006.01)
*G02B 27/26* (2006.01)
*G02B 27/28* (2006.01)
*G02B 5/20* (2006.01)
*G09F 9/33* (2006.01)

(52) U.S. Cl.
CPC .............. *G02B 27/26* (2013.01); *G02B 27/288* (2013.01); *G02B 5/201* (2013.01); *G09F 9/33* (2013.01)
USPC ............................ 362/19; 362/97.1; 362/97.4

(58) Field of Classification Search
None
See application file for complete search history.

(56) References Cited

U.S. PATENT DOCUMENTS 7,974,082 B2 * 7/2011 Uchimi .................... 361/679.21

FOREIGN PATENT DOCUMENTS

JP 2007-206173 A 8/2007

OTHER PUBLICATIONS

English machine translation of JP 2007-206173 (KOGA).*

* cited by examiner

*Primary Examiner* — Natalie Walford
(74) *Attorney, Agent, or Firm* — Lerner, David, Littenberg, Krumholz & Mentlik, LLP (57) ABSTRACT

Provided is a display apparatus including: a display panel which includes a plurality of light emitting elements arrayed to form a space between the plurality of light emitting elements adjacent to each other, and which is configured to form an image by the plurality of light emitting elements; and an optical member including a plurality of optical functional sheets, and an elastic body which includes a partition wall configured to partition the plurality of optical functional sheets and which is configured to array and hold the plurality of optical functional sheets to respectively correspond to the plurality of light emitting elements by at least one light emitting element of the plurality of light emitting elements, the optical member being attached to the display panel in such a manner that the partition wall is arranged in the space.

6 Claims, 6 Drawing Sheets

DISPLAY APPARATUS, OPTICAL MEMBER, AND METHOD OF MANUFACTURING AN OPTICAL MEMBER

BACKGROUND

The present disclosure relates to a display apparatus, for example, using light emitting elements such as LEDs (Light Emitting Diodes) as self-luminous pixels, an optical member to be used for the display apparatus, and a method of manufacturing the optical member.

For example, a display apparatus described in Japanese Patent Application Laid-open No. 2007-206173 (hereinafter, referred to as Patent Document 1) includes a display panel being a PDP (plasma display panel), an optical film serving as a protective plate that protects the display panel, and a casing for supporting and fixing the display panel and the optical film. Onto the periphery of the optical film, conductive rubbers are attached. Specifically, the optical film is fit via the conductive rubber into a frame-like main body of the parts constituting the casing. With such a configuration of the display apparatus, for example, as compared to a case of directly attaching the optical film to the display panel with attachment metal pieces, more uniform stress will be applied to the optical film. Thus, damage to the optical film is suppressed (for example, see paragraphs [0015] and [0033] in description, and FIGS. 1 and 2 of Patent Document 1).

By the way, in a case of adding a function of displaying a three-dimensional image to the display apparatus using the LEDs as the self-luminous pixels, it is necessary, for example, to bond a polarization filter to an LED array panel being the display panel. In general, screwing is used for attaching the polarization filter to the LED array panel. Otherwise, in the case where intervals between the LED elements are short, that is, in the case where it is difficult to ensure adequate spaces for the screwing, the polarization filter is attached to the LED array panel with a double-faced tape, adhesive, or the like. Such an attachment work is manually performed by a worker, typically.

SUMMARY

However, the above-mentioned method of attaching the polarization filter needs much effort, which is a burden on workers.

For example, in recent years, the size of the LED has become significantly small, and pitch between the LEDs has become short. Under this situation, it is difficult to form bosses for the screwing between the LEDs, and the method using the screwing has limitations.

On the other hand, the method using the double-faced tape or the like, which is an attaching method other than the screwing, needs efforts of the workers. Additionally, there is a problem that it is difficult to align the LED array panel with the polarization filter. In particular, in a case of the display apparatus using the light emitting elements such as the LEDs as the self-luminous pixels, the display apparatus has a relatively large size, and hence the burden on the workers increases.

The above-mentioned problems are not limited to the polarization filter, but that is the case with the optical members having some optical functions, such as the protective plate.

In view of the above-mentioned circumstances, there is a need for providing a technique relating to a display apparatus, which is capable of attaching an optical member such as a polarization filter to a display panel by easy alignment of the optical member with the display panel and easy attachment work thereof.

In order to achieve the above-mentioned object, according to an embodiment of the present disclosure, there is provided a display apparatus including a display panel and an optical member.

The display panel includes a plurality of light emitting elements. The plurality of light emitting elements are arrayed to form a space between the plurality of light emitting elements adjacent to each other. The display panel forms an image by the plurality of light emitting elements.

The optical member includes plurality of optical functional sheets and an elastic body. The elastic body includes a partition wall configured to partition the plurality of optical functional sheets and is configured to array and hold the plurality of optical functional sheets to respectively correspond to the plurality of light emitting elements by at least one light emitting element of the plurality of light emitting elements. The optical member is attached to the display panel in such a manner that the partition wall is arranged in the space.

The elastic body has stretch properties, and further, the partition wall of the elastic body is arranged in the space between the light emitting elements, and hence without using the screws, the doubled-face tape, or the like, it is possible to perform the alignment and the attachment work thereof, easily. Further, the elastic body is used, and hence it is possible to protect the light emitting elements from physical impacts, for example.

The plurality of light emitting elements of the display panel may be arrayed in a two-dimensional matrix form. In this case, the partition wall of the elastic body includes a beam formed along a group of light emitting elements linearly arrayed along at least one of a horizontal line and a vertical line for forming the image, of the plurality of light emitting elements. In this case, the elastic body of the optical member may hold the plurality of optical functional sheets to be arranged along at least one of a horizontal line and a vertical line.

The plurality of optical functional sheets of the optical member may include a plurality of first polarization filters each configured to form a first polarization plane, and a plurality of second polarization filters each configured to form a second polarization plane different from the first polarization plane. In this case, the elastic body of the optical member arrays the plurality of first polarization filters and the plurality of second polarization filters alternately by the group of light emitting elements linearly arrayed, and holds the plurality of first polarization filters and the plurality of second polarization filters, and the display apparatus forms a three-dimensional image as the image.

According to an embodiment of the present disclosure, there is provided an optical member that is attached to a display panel and includes a plurality of optical functional sheets and an elastic body.

The display panel includes a plurality of light emitting elements arrayed to form a space between the plurality of light emitting elements adjacent to each other and forms an image by the plurality of light emitting elements.

The elastic body includes a partition wall configured to partition the plurality of optical functional sheets, and is configured to array and hold the plurality of optical functional sheets to respectively correspond to the plurality of light emitting elements by at least one light emitting element of the plurality of light emitting elements. Further, the elastic body is attached to the display panel in such a manner that the partition wall is arranged in the space. According to an embodiment of the present disclosure, there is provided a method of manufacturing an optical member that is attached to a display panel which includes a plurality of light emitting elements arrayed to form a space between the plurality of light emitting elements adjacent to each other, and which is configured to form an image by the plurality of light emitting elements, the method comprising:

The manufacturing method includes clamping optical functional sheets in such a manner that between a plurality of core pieces of a core member that are arranged to respectively correspond to arrays of the plurality of light emitting elements and a plurality of protrusion pieces that are arranged in a cavity member to respectively correspond to arrays of the plurality of core pieces, the optical functional sheets are sandwiched to correspond to the plurality of core pieces by at least one core piece of the plurality of core pieces.

A material of an elastic body configured to array and hold the plurality of optical functional sheets is fed into the cavity of the cavity member after the clamping.

The optical functional sheets are sandwiched by the clamping between the plurality of core pieces and the plurality of protrusion pieces, which are provided to respectively correspond to the arrays of the light emitting elements. In this manner, the optical member with the optical functional sheets and the elastic body being integrated is manufactured. The elastic body has stretch properties, and hence when the optical member manufactured in the above-mentioned manner is attached to the display panel, without using the screws, the doubled-face tape, or the like, it is possible to attach to the display panel the optical member.

As described above, according to the embodiments of the present disclosure, it is possible to attach an optical member such as a polarization filter to a display panel by easy alignment of the optical member and the display panel and easy attachment work thereof.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.
[Configuration of Display Apparatus]

Figure 1:
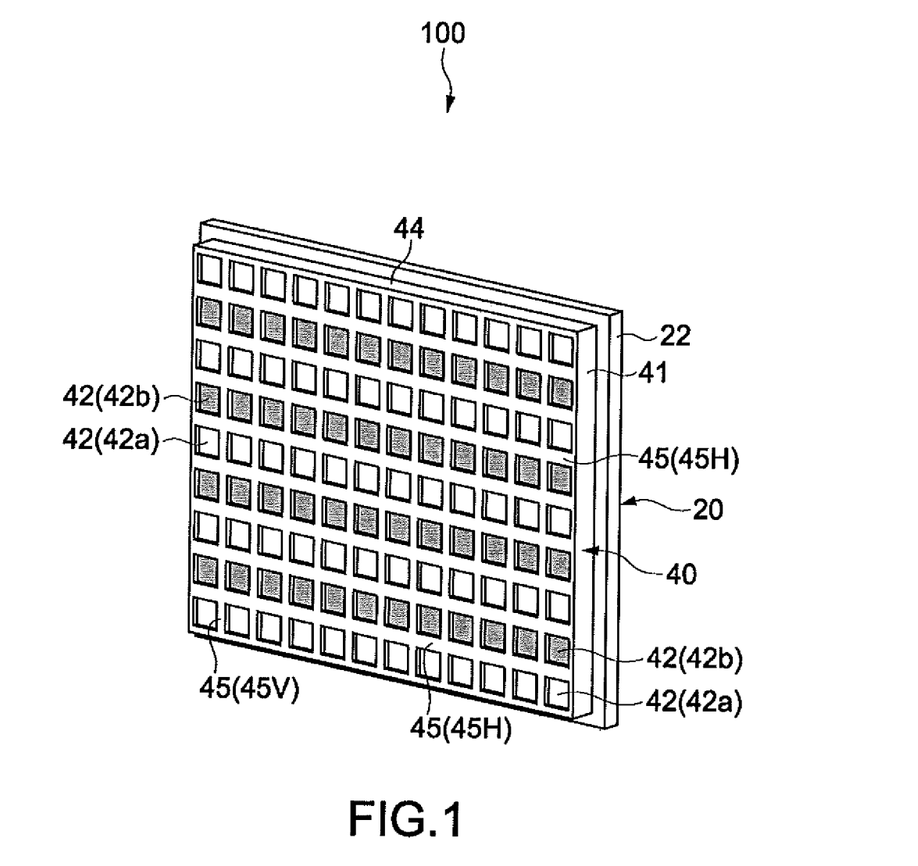
FIG. 1 is a view showing a display apparatus according to an embodiment of the present disclosure.
Figure 2:
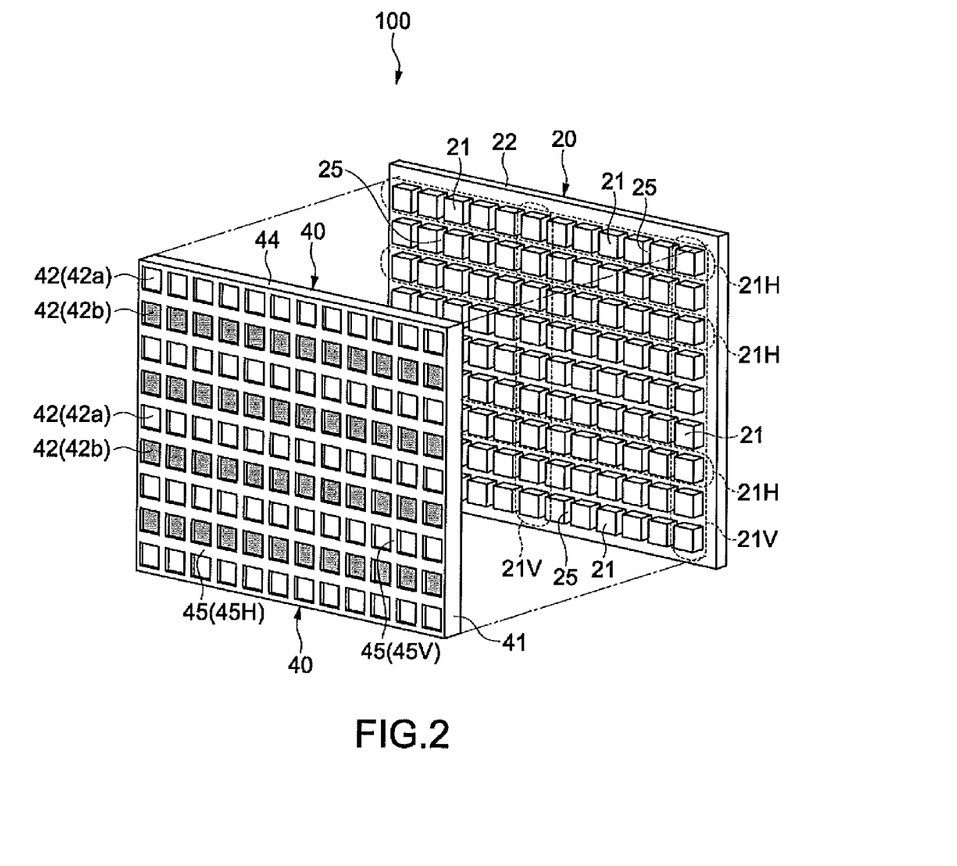
FIG. 2 is an exploded perspective view of the display apparatus shown in FIG. 1.

FIG. 1 is a view showing a display apparatus according to an embodiment of the present disclosure. FIG. 2 is an exploded perspective view of the display apparatus.

A display apparatus 100 includes a display panel 20 and a polarization control panel 40 serving as an optical member.

The display apparatus 100 is, for example, an apparatus that forms a three-dimensional image by using a polarization control method. Thus, the user wears glasses for polarization in order to perceive the three-dimensional image.

The display panel 20 includes a substrate 22 and a plurality of LEDs 21 that are supported on the substrate 22 and arranged in a two-dimensional matrix form. The LEDs 21 serve as a plurality of light emitting elements.

Figure 3:
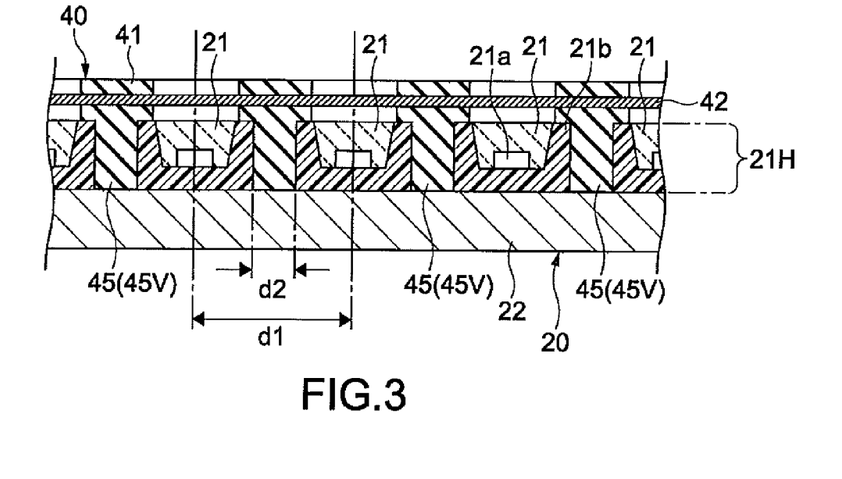
FIG. 3 is a sectional view of the display apparatus as viewed in a vertical direction.
Figure 4:
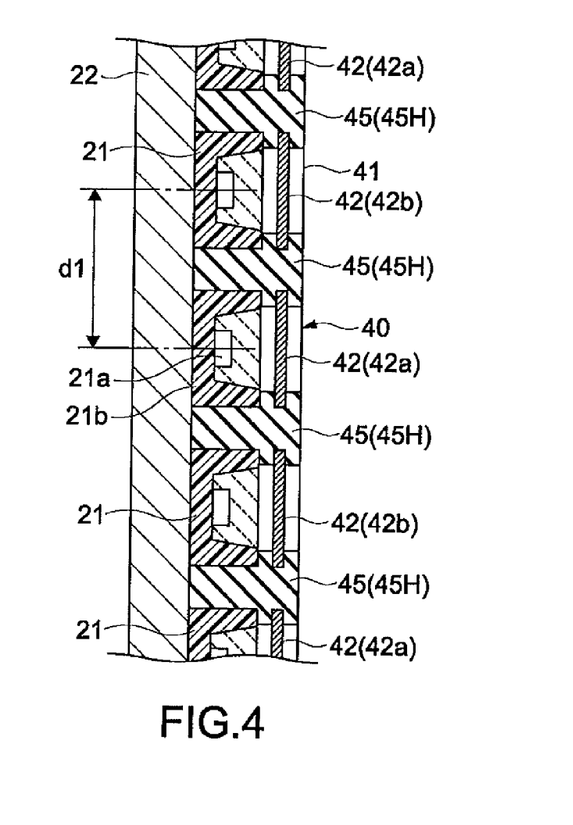
FIG. 4 is a sectional view of the display apparatus as viewed in a horizontal direction.

FIG. 3 is a sectional view of the display apparatus 100 as viewed in a vertical direction. FIG. 4 is a sectional view of the display apparatus 100 as viewed in a horizontal direction. As shown in those drawings, the LEDs 21 are formed by packing each of LED chips 21a with each of resin packages 21b each having substantially a cuboid shape. As shown in FIGS. 2 and 3, the LEDs 21 are supported by the substrate 22 in such a manner that a space 25 is formed between the LEDs 21 adjacent to each other.

One of the LEDs 21 emits the light having a predetermined wavelength region, and constitutes one pixel. For example, three LEDs 21 continuously arranged to emit red, green, and blue lights, respectively. The three continuous LEDs 21 can be arranged in various forms, and the arrangement thereof is not limited herein. It should be noted that in addition to three primary colors of red, green, and blue, the LEDs 21 that emit another color light may be used. The display panel controls the luminance of each of the LEDs 21 on the basis of the luminance information of the video signals, to thereby form a full color image.

The polarization control panel 40 includes polarization filters 42 serving as optical functional sheets and an elastic frame 41 serving as an elastic body that supports the polarization filters 42.

Each of the polarization filters 42 has a function of receiving the light incident from the LEDs 21 and emitting polarized light having a predetermined polarization plane. In order to generate the three-dimensional image, the polarization control panel 40 is provided with two kinds of polarization filters 42 (42a and 42b) having different polarization planes, for example. The polarization filters 42 are formed to be long in a direction along a horizontal line for forming an image on the display panel 20. The polarization filters 42 are arrayed in the vertical direction to respectively correspond to horizontal-line LED groups 21H along the horizontal line for each of horizontal-line LED groups 21H. In order to form the three-dimensional image, typically, the polarization filters 42a and 42b are used, which have polarization planes of a right circularly-polarized light and a left circularly-polarized light (or elliptically-polarized lights), respectively. Two kinds of polarization filters 42a and 42b are held by the elastic frame 41 to be alternately arrayed in the vertical direction.

As a material of the elastic frame 41, for example, a thermoplastic elastomer is used. Although as the thermoplastic elastomer, for example, a silicon, a fluorine, a nitrile, a urethane, or the like is used, the material is not limited thereto.

The elastic frame 41 includes, as shown in FIGS. 1 and 2, an edge frame portion 44 and beam portions 45. The beam portions 45 include horizontal beams 45H and vertical beams 45V. Those beams 45H and 45V are provided inside of the edge frame portion 44 surrounding them, and function as partition walls for partitioning the arrays of the polarization filters 42.

The horizontal beams 45H partition the polarization filters 42 to respectively correspond to arrays of the LEDs 21 for each of the horizontal-line LED groups 21H as described above. The vertical beams 45V partition the polarization filters 42 to respectively correspond to the arrays along a vertical line of the LEDs 21 for each of vertical-line LED groups 21V in the arrays of the LEDs 21. The plurality of horizontal beams 45H and the plurality of vertical beams 45V constitute a grid.

When into the spaces 25 (see FIG. 1) between the LEDs 21, the beam portions 45 of the elastic frame 41 are fit as shown in FIGS. 3 and 4, the polarization control panel 40 is attached to the display panel 20.

Each of pitches d1 (see FIG. 3) between the LEDs 21 is set to no less than 4 mm and no more than 10 mm both in the horizontal direction and the vertical direction. Typically, the pitch d1 is 4.4 mm. The pitches in the horizontal direction and the vertical direction may be equal or different with respect to each other. When the LEDs 21 are arrayed with such a pitch d1, the size of the display panel 20 that can obtain the resolution of full HD (High Definition) is 280 inches (711.2 cm) or more, for example. However, it is needless to say that the size of the display panel 20 is not limited thereto.

On the other hand, an interval d2 of each of the spaces 25 is set to no less than 1 mm and no more than 8 mm. For example, assumed that the size of each of the LEDs 21 is 1.4 mm cube and the pitch d1 is 4.4 mm, the interval d2 of the space 25 is set to 1.6 mm.

When the interval d2 of the space 25 is less than 1 mm, the beam portions 45 is thin and easy to be fractured, and there is a fear that during manufacturing of the display apparatus 100, the efforts of the workers during the attachment of the elastic frame 41 to the display panel 20 are increased due to the thinness.

When the interval d2 of the space 25 is more than 8 mm, the width of the beam portion 45 of the elastic frame 41 increases, and the weight of the elastic frame 41 also increases. As a result, stress to be applied to the LEDs 21 from the elastic frame 41 increases. Due to this, there is a fear that the LEDs 21 are adversely affected, for example, the LEDs 21 is damaged. When the pitch d1 is no less than 4 mm and no more than 10 mm as described above, the interval d2 of the space 25 is set to 7.2 mm. That is, the interval d2 of the space 25 ranges from 1.6 to 7.2 mm. The width of the beam portion 45 arranged between the LEDs 21 is equal to the interval d2 of the space 25 or slightly smaller than the interval d2 of the space 25.

[Method of Manufacturing Display Apparatus]

A method of manufacturing the display apparatus 100 thus configured, in particular, a method of manufacturing the polarization control panel 40 will be described. FIG. 5 are view for describing such a method in order.

Figure 5A:
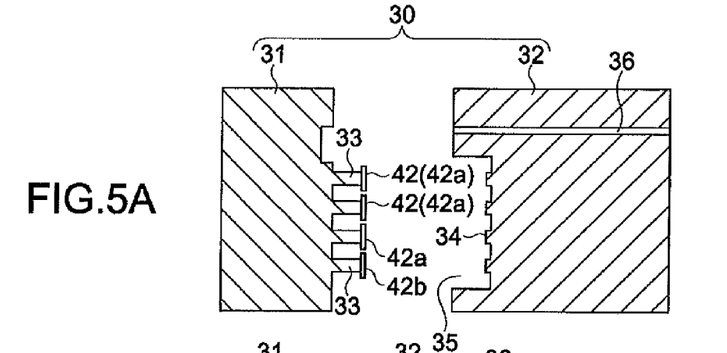
FIG. 5 are views for describing a method of manufacturing a polarization control panel in order.

As shown in FIG. 5A, a mold including a core member 31 and a cavity member 32 is prepared. The core member 31 includes core pieces 33 arranged to respectively correspond to the arrays of the LEDs 21 of the display panel 20. Further, the cavity member 32 includes a cavity 35 and protrusion pieces 34 arranged to respectively correspond to the core pieces 33, the protrusion pieces 34 being provided within the cavity 35. Onto the core pieces 33 of the core member 31 thus configured, the polarization filters 42 are bonded.

Figure 6A:
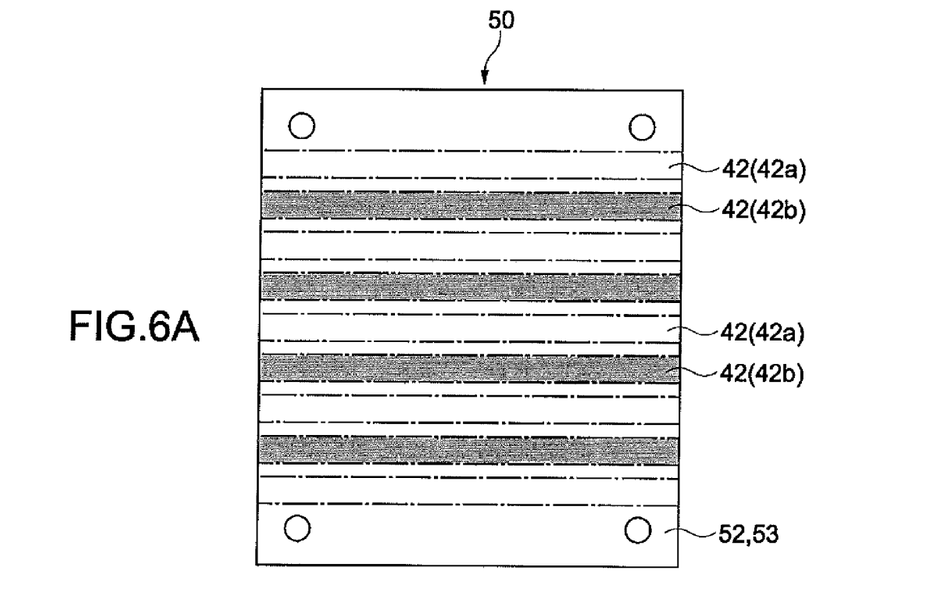
FIG. 6 are views for describing a method of bonding a polarization filter to a core member.

FIGS. 6 and 7 are views for describing a method of bonding the polarization filters 42 to the core member 31. As shown in FIG. 6A, a sheet 50 including pieces of release paper 52 and 53 is prepared. On the pieces of release paper 52 and 53, the polarization filters 42a each having a polarization plane of the right polarized light and the polarization filters 42b each having a polarization plane of the left polarized light are alternately arrayed and held in advance.

Figure 6B:
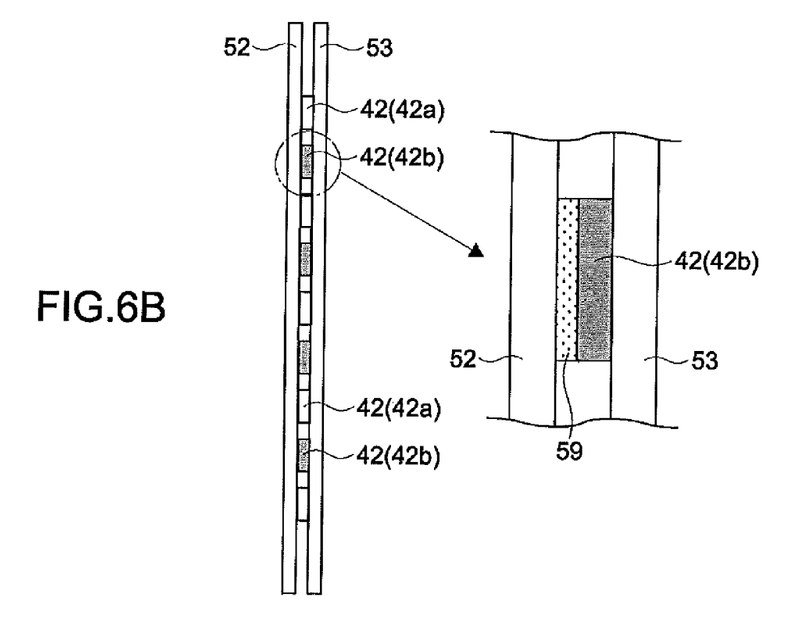

As shown in FIG. 6B, onto one surface of each of the polarization filters 42, a transparent adhesive 59 is applied. On the other surface of each of the polarization filter 42, a transparent material having a low adhesiveness is applied, which is not shown. The pieces of release paper 52 and 53 are bonded onto both of the surfaces of each of the polarization filters 42, respectively.

Figure 7A:
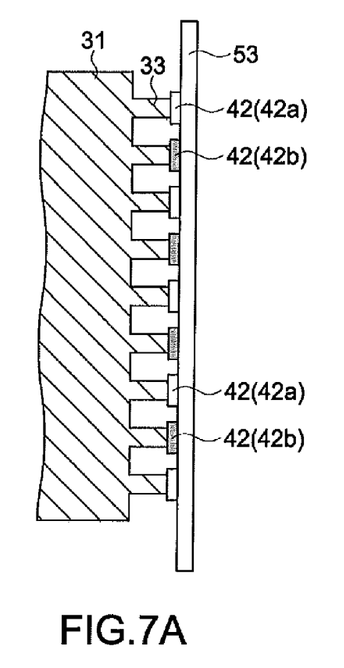
FIG. 7 are views for describing the method of bonding the polarization filter to the core member.
Figure 7B:
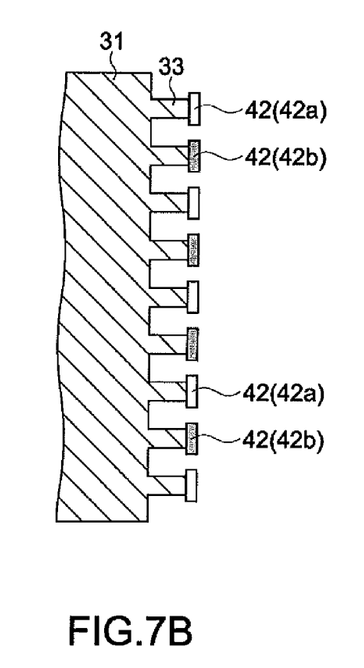

As shown in FIG. 7A, of the pieces of release paper 52 and 53 bonded onto the sheet 50 thus configured, the piece of release paper 52 on which the adhesive 59 is applied is released. Then, when the polarization filters 42 are bonded onto the core pieces 33, the sheet 50 is arranged on the core member 31. Then, as shown in FIG. 7B, the other piece of release paper 53 is released.

Figure 5B:
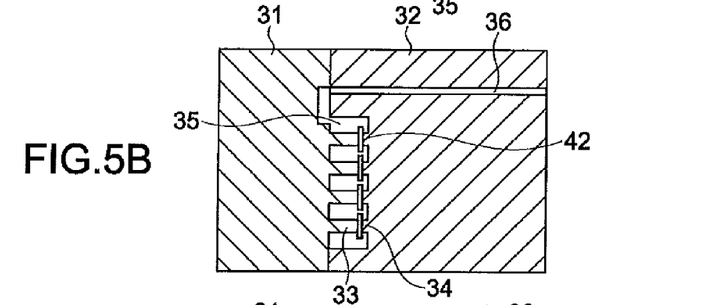
Figure 5C:
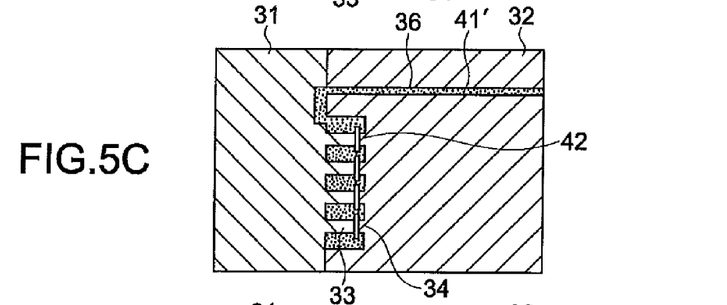
Figure 5D:
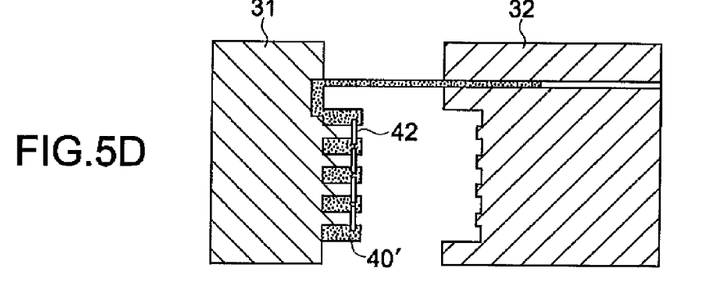

As shown in FIG. 5B, mold clamping is carried out. The core pieces 33 and the protrusion pieces 34, which are arranged to each other, sandwich the polarization filters 42 therebetween. As shown in FIG. 5C, an elastomer material 41' formed into a continuous form by heating is fed via a channel 36 such as a runner formed in the cavity member 32 and the like into the cavity 35. Then, as shown in FIG. 5D, the core member 31 and the cavity member 32 are separated from each other. Then, the mold releasing is carried out, and the polarization control panel 40 is formed.

As the molding condition by molding using the mold as described above, the following condition is exemplified.

Elastomer material: "septon CJ002 hardness 65" manufactured by KURARAY CO., LTD.

Molding time: about 20 seconds

Molding temperature: temperature of the elastomer material is 160° C., and temperature of the mold ranges from 30 to 40° C.

Here, when such a temperature ranges approximately from 70 to 80° C., some kinds of the polarization filters 42 are deteriorated, and may not exert their function sufficiently. However, according to the molding method according to this embodiment, the polarization filters 42 are sandwiched between the core pieces 33 and the protrusion pieces 34. Therefore, as shown in FIG. 5C, even if the elastomer material 41' heated up to 160° C. flows into the cavity 35, the elastomer material 41' does not come into contact with parts of the polarization filters 42, the parts exerting their function. Thus, it is possible to prevent the polarization filters 42 from being deteriorated.

The polarization control panel 40 manufactured in the above-mentioned manner is attached to the display panel 20 in the following manner. For example, the worker arranges each of the beams 45H and 45V of the elastic frame 41 formed in the polarization control panel 40 into each of the spaces 25 between the LEDs 21 manually in order to attach the polarization control panel 40 to the display panel 20. Alternatively, the polarization control panel 40 may be attached to the display panel 20 mechanically rather than manually.

As described above, in this embodiment, the elastic frame 41 has stretch properties, and further, the beam portions 45 of the elastic frame 41 are arranged in the spaces 25 between the LEDs 21, and hence without using the screws, the doubled-face tape, or the like, the worker can perform the alignment and the attachment work thereof, easily.

Further, as a member configured to hold the polarization filters 42 and arrange the polarization filters 42 to be opposed to the LEDs 21, the frame 41 having stretch properties is used, and hence it is possible to protect the light emitting element such as the LEDs 21 from physical impacts.

In this embodiment, for each of the LEDs 21, that is, each pixel, each of the beams 45H and 45V partitions the polarization filters 42, and hence the polarization filters 42 that are originally long in one direction as shown in FIG. 6A are physically partitioned for each pixel. Thus, it is possible to suppress interference of light from the LEDs 21 adjacent to each other, and hence the contrast of each pixel can be increased. More specifically, for example, rather than a case where only the horizontal beams 45H are provided in order to partition the polarization filters 42 long in the horizontal direction with respect to each other as will be described later, the case where the horizontal beams and the vertical beams 45V are provided can increase the contrast of each pixel.

In this embodiment, the polarization control panel 40 with the polarization filters 42 and the elastic frame 41 being integrated is manufactured, and hence, for example, the work of bonding the polarization filters 42 onto the display panel 20 with the doubled-face tape or the like one by one can be eliminated.

[Other Embodiment]

The embodiment according to the present disclosure is not limited to the above-mentioned embodiment, and other various embodiments can be realized.

Although in the above-mentioned embodiment, the polarization method is described as a method for generating the three-dimensional image, the method is not limited thereto, but a parallax barrier method may be employed. In this case, for example, a lenticular sheet or the like is used, and the lenticular sheet is held by the elastic frame 41 as in the above-mentioned embodiment, to thereby form the optical member.

Further, the present disclosure is not limited to the display apparatus 100 that displays the three-dimensional image. In a display apparatus that displays a two-dimensional image, in place of the above-mentioned polarization control panel 40, optical members having other functions, for example, a protective plate and a light guide plate may be used.

Although as the polarization filters 42, the filters each having the polarization plane of the circularly-polarized light is used, filter each having a polarization plane of linearly-polarized light different from each other may be used.

The display apparatus 100 according to the above-mentioned embodiment has the configuration in which the polarization filters 42a and 42b having two kinds of polarization planes are arrayed along the vertical direction of the display panel 20. However, a configuration in which those two kinds of the polarization filters 42a and 42b are alternately arrayed along the horizontal direction of the display panel 20 in such a manner that a longitudinal direction of the polarization filters 42a and 42b is arranged along the vertical direction.

The above-mentioned beam portions 45 of the elastic frame 41 include the horizontal beams 45H and the vertical beams 45V in order to partition pixels. However, only the horizontal beams 45H may be provided in order to partition the polarization filters 42 long in the horizontal direction as in the above-mentioned embodiment. Alternatively, in the form in which the two kinds of the polarization filters 42a and 42b are alternately arranged along the horizontal direction as described above, only the vertical beams 45V may be provided in order to partition those polarization filters 42.

The display apparatus 100 according to the above-mentioned embodiment has the configuration in which one LED 21 corresponds to one pixel (one sub pixel). However, the display apparatus 100 may have a configuration in which a plurality of LEDs 21 correspond to one pixel.

Further, the light emitting elements such as the LEDs 21 are not limited to the form in which they are arrayed along lines such as the horizontal line and the vertical line, but, for example, the light emitting elements such as the LEDs 21 may be arrayed in a non-line form such as a houndstooth form or a zigzag form. In this case, the beams (partition walls) of the elastic frame 41 do not have a linear shape, but a shape corresponding to the shapes of the spaces 25 formed correspondingly to the arrangement of the LEDs 21.

Although in the above-mentioned embodiment, as the light emitting elements, the LEDs 21 being injection EL (Electro-Luminescence) elements are used, intrinsic EL elements may be used.

The method of manufacturing the display apparatus 100 shown in FIGS. 5 to 7 is merely an example, and other method may be used. For example, although in FIG. 5, the vertical mold, that is, the mold in which the core member 31 and the cavity member 32 move horizontally is described, a mold in which the core member 31 and the cavity member 32 move vertically may be used. In this case, the core member 31 is arranged below the cavity member 32, so that even if the adhesive 59 is not applied to the polarization filters 42, the polarization filters 42 can be disposed on the core pieces 33 of the core member 31.

Although the above-mentioned embodiment, the size of each of the LEDs 21 is 1.4 mm cube, the size is not limited thereto, but the size may be smaller or larger than 1.4 mm cube. Further, the LED 21 may have different lengths in the horizontal direction and the vertical direction.

The present disclosure contains subject matter related to that disclosed in Japanese Priority Patent Application JP 2010-214008 filed in the Japan Patent Office on 24 Sep., 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus, comprising:
a display panel which includes a plurality of light emitting elements arrayed to form a space between the plurality of light emitting elements adjacent to each other, and which is configured to form an image by the plurality of light emitting elements; and
an optical member including
a plurality of optical functional sheets, and
an elastic body configured to array and hold the plurality of optical functional sheets to respectively correspond to the plurality of light emitting elements,
the elastic body having an edge frame portion arranged along an outer periphery thereof and a number of horizontal beams each arranged along a horizontal line and a number of vertical beams each arranged along a vertical line, in which each horizontal beam and each vertical beam is provided inside the edge frame portion, so as to form a single elastic frame having a plurality of areas each corresponding to a respective light emitting element, and
the optical member being attached to the display panel.

2. The display apparatus according to claim 1, wherein the plurality of light emitting elements of the display panel are arrayed in a two-dimensional matrix form.

3. The display apparatus according to claim 2, wherein the plurality of optical functional sheets of the optical member include
a plurality of first polarization filters each configured to form a first polarization plane, and
a plurality of second polarization filters each configured to form a second polarization plane different from the first polarization plane,
the elastic body of the optical member arrays the plurality of first polarization filters and the plurality of second polarization filters alternately by the group of light emitting elements linearly arrayed, and holds the plurality of first polarization filters and the plurality of second polarization filters, and the display apparatus forms a three-dimensional image as the image.

4. An optical member, that is attached to a display panel which includes a plurality of light emitting elements arrayed to form a space between the plurality of light emitting elements adjacent to each other and which is configured to form an image by the plurality of light emitting elements, the optical member comprising:

a plurality of optical functional sheets; and an elastic body configured to partition the plurality of optical functional sheets, is configured to array and hold the plurality of optical functional sheets to respectively correspond to the plurality of light emitting elements, the elastic body having an edge frame portion arranged along an outer periphery thereof and a number of horizontal beams each arranged along a horizontal line and a number of vertical beams each arranged along a vertical line, in which each horizontal beam and each vertical beam is provided inside the edge frame portion, so as to form a single elastic frame having a plurality of areas each corresponding to a respective light emitting element, and the elastic body is attached to the display panel.

5. The display apparatus according to claim 1, in which a pitch associated with adjacent ones of the light emitting elements in both the horizontal direction and the vertical direction has a value in a range of 4 mm to 10 mm, such that a distance between a first horizontal beam and a second horizontal beam immediately adjacent to the first horizontal beam provided inside the edge frame portion has a value equal to that of the pitch and such that a distance between a first vertical beam and a second vertical beam immediately adjacent to the first vertical beam provided inside the edge frame portion has a value equal to that of the pitch.

6. The display apparatus according to claim 1, in which said each horizontal beam and said each vertical beam provided inside the edge frame portion has a width associated therewith in a range from 1.6 mm to 7.2 mm.

* * * * *